US011867072B2

(12) United States Patent
Been

(10) Patent No.: US 11,867,072 B2
(45) Date of Patent: Jan. 9, 2024

(54) ON-LINE VERIFIABLE TRIP AND THROTTLE VALVE ACTUATOR

(71) Applicant: Woodward, Inc., Fort Collins, CO (US)

(72) Inventor: John Been, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/991,456

(22) Filed: Nov. 21, 2022

(65) Prior Publication Data

US 2023/0175415 A1 Jun. 8, 2023

Related U.S. Application Data

(60) Provisional application No. 63/265,001, filed on Dec. 6, 2021.

(51) Int. Cl.

| | |
|---|---|
| ***F01D 21/18*** | (2006.01) |
| ***F01D 17/26*** | (2006.01) |
| ***F15B 15/14*** | (2006.01) |
| ***F15B 15/20*** | (2006.01) |

(52) U.S. Cl.

CPC ............. *F01D 21/18* (2013.01); *F01D 17/26* (2013.01); *F15B 15/1409* (2013.01); *F15B 15/149* (2013.01); *F15B 15/1423* (2013.01); *F15B 15/1428* (2013.01); *F15B 15/1476* (2013.01); *F15B 15/202* (2013.01)

(58) Field of Classification Search

CPC ...... F01D 21/18; F01D 17/26; F15B 15/1409; F15B 15/1423; F15B 15/1428; F15B 15/1476; F15B 15/149; F15B 15/202; F05D 2220/31; F16K 27/0263

USPC ...................................................... 251/27, 29

See application file for complete search history.

(56) References Cited

U.S. PATENT DOCUMENTS

| | | | |
|---|---|---|---|
| 2,617,438 | A | 11/1952 | Doran |
| 3,928,977 | A | 12/1975 | Braytenbah et al. |
| 4,337,687 | A | 7/1982 | Hoover |
| 4,585,205 | A | 4/1986 | Coppola et al. |

(Continued)

FOREIGN PATENT DOCUMENTS

| | | |
|---|---|---|
| DE | 102011121777 | 6/2013 |
| KR | 101968265 | 4/2019 |

OTHER PUBLICATIONS

Invitation to Pay Additional Fees and, Where Applicable, Protest Fee in International Application No. PCT/US2022/051843, mailed on Mar. 21, 2023, 24 pages.

(Continued)

*Primary Examiner* — Daphne M Barry
(74) *Attorney, Agent, or Firm* — Fish & Richardson P.C.

(57) ABSTRACT

The subject matter of this specification can be embodied in, among other things, a fluid actuator system including a fluid actuator having a housing having an inner wall defining an interior cavity, a piston having a piston head configured for reciprocal movement within the interior cavity, the piston head contacting the inner wall and dividing the interior cavity into a first fluid chamber and a second fluid chamber, a first valve configured to control fluid flow between the first fluid chamber and a bypass conduit, and a second valve configured to control fluid flow between the bypass conduit and the second fluid chamber.

8 Claims, 3 Drawing Sheets

(56) References Cited

U.S. PATENT DOCUMENTS

| | | | | |
|---|---|---|---|---|
| 4,696,452 | A | 9/1987 | Miyagawa et al. | |
| 4,929,148 | A | 5/1990 | Nutter | |
| 5,848,779 | A | 12/1998 | Murbe et al. | |
| 9,816,623 | B2 | 11/2017 | Amirouch et al. | |
| 10,480,346 | B2 | 11/2019 | Leykauf | |
| 10,670,052 | B2 * | 6/2020 | Klingen | F15B 13/021 |

OTHER PUBLICATIONS

International Search Report and Written Opinion in International Application No. PCT/US2022/051843, dated May 22, 2023, 28 pages.

* cited by examiner

ON-LINE VERIFIABLE TRIP AND THROTTLE VALVE ACTUATOR

CROSS-REFERENCE TO RELATED PATENT APPLICATIONS

This application claims the benefit of priority to U.S. Provisional Patent Application No. 63/265,001, filed Dec. 6, 2021, the contents of which are incorporated by reference herein.

TECHNICAL FIELD

This instant specification relates to hydraulic actuators, more particularly steam turbine trip and throttle valve actuators.

BACKGROUND

When hydraulic cylinders are used to actuate fuel/steam valves and other various control systems, there is often a separate and independent safety system that utilizes a multitude of high flow dump valves to move the hydraulic actuators to a fail-safe position quickly, known as a "trip" of the system.

Steam turbine operators will often keep their machines running for five or more years without ever shutting down. In order to operate safely and for longer periods of time, the turbine manufacturers offer their customers safety system products, like the trip and throttle valve (TTV) that can undergo some limited functional testing without shutting down the turbine. This partially ensures that the safety system will operate in the event of a real emergency event.

Traditional TTVs use a design most commonly associated with the manufacturer "Gimpel", and due to the popularity of the Gimpel design, trip and throttle valves are often referred to as "Gimpel Valves". Gimpel-style TTVs offer an ability to partial-stroke test the actuator on-line by bleeding pressure from the working side of the piston to the drained side. This test is often performed manually by an operator physically pulling a test valve handle on the side of the actuator. While this does test the function of the final actuating piston and the valve stem, this does not test the large dump valve responsible for draining the actuator in the event of an emergency.

Traditional TTVs also require an operator to manually open the valve when starting the turbine by turning a hand wheel. As the wheel is turned, the TTV actuator slowly opens the steam valve and admits steam into the turbine. This is the "throttling" function denoted in name "Trip and Throttle Valve". Once the turbine is warmed up and near its idle speed, the TTV is opened fully and the steam turbine governing valves (a separate valve downstream of the TTV) take over throttling control.

As such, existing TTVs have a number of shortcomings. While some manufacturers offer products capable of on-line testing, no known trip and throttle valve designs offer the ability to test every moving element of the actuator without actually tripping the system. Many commercial offerings do not offer any sort of emergency trip function within a position controlling actuator. Emergency trip functions are generally delegated to a separate, trip-only, two-position actuator. Many high-speed trip systems require very large return springs on the actuator in order to provide an adequate trip time due to small, restrictive flow areas in the dump valves. Traditional trip systems utilize a series of fast acting, close clearance solenoid valves and or (in combination with)

cartridge valves to evacuate fluid from the actuators. Some TTVs are also prone to sticking when operating in contaminated oil.

SUMMARY

In general, this document describes hydraulic actuators, more particularly trip and throttle valve actuators.

In an example embodiment, a fluid actuator includes an inner cylindrical housing having a first end, a second end opposite the first end, and a first inner wall, a piston having a piston head configured to fluidically seal against the first inner wall and configured to move axially along a portion of the first inner wall, an outer cylindrical housing arranged at least partly about the inner cylindrical housing, the outer cylindrical housing having a third end, a fourth end opposite the third end, and a second inner wall, an annular cavity defined between the outer cylindrical housing and the inner cylindrical housing, a first moveable plate configured to fluidically seal against the second inner wall and configured to move axially along a first portion of the second inner wall between the first end and the third end, and a second moveable plate configured to fluidically seal against the second inner wall and configured to move axially along a second portion of the second inner wall between the second end and the fourth end.

Various embodiments can include some, all, or none of the following features. The first moveable plate is configured to configurably seal against the first end in a first configuration such that the piston head, the first inner wall, and the first moveable plate define a first fluid chamber, and configurably unseal the first end in a second configuration such that fluid flow is permitted between the first fluid chamber and the annular cavity. The fluid actuator can include a fluid port defined in the outer cylindrical housing, and a fluid conduit defined in the first moveable plate between an inlet at a lateral peripheral face of the first moveable plate and an outlet at a primary face of the first moveable plate proximal the first end, where the inlet is configured to align with the fluid port in the first configuration, and the fluid port is blocked by the first moveable plate in the second configuration. The second moveable plate can be configured to configurably seal against the second end in a first configuration such that the piston head, the first inner wall, and the second moveable plate define a second fluid chamber, and configurably unseal the second end in a second configuration such that fluid flow is permitted between the second fluid chamber and the annular cavity. The fluid actuator can include a fluid port, in fluid communication with the annular cavity, defined in the outer cylindrical housing proximal the fourth end, where the second moveable plate is configured to block the fluid port in the second configuration and permit fluid flow between the fluid port and the annular cavity in the first configuration. The fluid actuator can include a first bias member configured to urge the first moveable plate away from sealing contact with the first end. The fluid actuator can include a second bias member configured to urge the second moveable plate away from sealing contact with the second end. The fluid actuator can include an end plate proximal the third end, where the outer cylindrical housing, the end plate, and the first moveable plate define a fluid chamber, and a fluid port defined in the end plate, in fluid communication with the fluid chamber. The fluid actuator can include an end plate proximal the fourth end, where the outer cylindrical housing, the end plate, and the second moveable plate define a fluid chamber, and a fluid port defined in the end plate, in fluid communication with the fluid chamber.

In an example implementation, a method of fluid actuation includes actuating a first moveable plate into sealing contact with a first end of an inner cylindrical housing having a first inner wall and a second end opposite the first end, where a piston in fluidically sealing contact with the first inner wall, the first inner wall, and the first moveable plate in sealing contact with the first end define a first fluid chamber, actuating the first moveable plate away from sealing contact with the first end, flowing fluid from the first fluid chamber to an annular cavity defined between the inner cylindrical housing and an outer cylindrical housing arranged at least partly about the inner cylindrical housing, the outer cylindrical housing having a third end, a fourth end opposite the third end, and a second inner wall, and actuating a second moveable plate into sealing contact with the second end where the piston, the first inner wall, and the second moveable plate in sealing contact with the second end define a second fluid chamber.

Various implementations can include some, all, or none of the following features. Actuating a first moveable plate into sealing contact with the first end can include fluidically connecting, by a fluid conduit defined in the first moveable plate between an inlet at a lateral peripheral face of the first moveable plate and an outlet at a primary face of the first moveable plate proximal the first end, the first fluid chamber and a fluid port defined in the outer cylindrical housing. Actuating the first moveable plate away from sealing contact with the first end can include blocking, by the first moveable plate, the fluid port. Actuating a second moveable plate into sealing contact with the second end can include blocking, by the second moveable plate, a fluid port defined in the outer cylindrical housing proximal the fourth end, and actuating the second moveable plate away from sealing contact with the second end unblocks the fluid port and permits fluid flow between the fluid port and the annular cavity. Actuating a second moveable plate into sealing contact with the second end can include pressurizing a fluid chamber defined by the second moveable plate, the second inner wall, and an end plate proximal the fourth end, and urging, by the pressurizing, movement of the second moveable plate toward the second end. Actuating a first moveable plate into sealing contact with the first end can include pressurizing a fluid chamber defined by the first moveable plate, the second inner wall, and an end plate proximal the third end, and urging, by the pressurizing, movement of the first moveable plate toward the first end. Actuating the first moveable plate away from sealing contact with the first end can include urging, by a bias member, the first moveable plate away from the first end. The method can include urging, by a bias member, movement of the second moveable plate away from the second end.

In another example embodiment, a fluid actuator system includes a fluid actuator includes a housing having an inner wall defining an interior cavity, a piston having a piston head configured for reciprocal movement within the interior cavity, the piston head contacting the inner wall and dividing the interior cavity into a first fluid chamber and a second fluid chamber, a first valve configured to control fluid flow between the first fluid chamber and a bypass conduit, and a second valve configured to control fluid flow between the bypass conduit and the second fluid chamber.

Various embodiments can include some, all, or none of the following features. The first valve can be a normally open valve and the second valve is a normally open valve. The first valve can be a fluid-controlled valve configured to be urged closed by a pressurized fluid received at a control port of the first valve from a fluid pressure source. The fluid actuator system can include a third valve configured to fluidically connect the control port to the fluid pressure source in a first configuration and fluidically connect the control port to a fluid drain in a second configuration. The second valve can be a fluid-controlled valve configured to be urged closed by a pressurized fluid received at a control port of the second valve from a fluid pressure source. The fluid actuator system can include a fourth valve configured to fluidically connect the control port to the fluid pressure source in a first configuration and fluidically connect the control port to a fluid drain in a second configuration. The first fluid chamber can be configured to receive fluid pressure from a controllable servo valve configured to control fluid flow from a fluid pressure source to the first fluid chamber. The fluid actuator system can include a fifth valve configured to permit fluid flow from the fluid pressure source to a drain in a first configuration, and block fluid flow from the fluid pressure source to the drain in a second configuration.

In another example implementation, a method of fluid actuation includes closing a first valve configured to block fluid flow between a first fluid chamber of a fluid actuator and a bypass conduit, opening the first valve to permit fluid flow between the first fluid chamber and the bypass conduit, closing a second valve configured to block fluid flow between a second fluid chamber of the fluid actuator and the bypass conduit, and opening the second valve to permit fluid flow between the second fluid chamber and the bypass conduit.

Various implementations can include some, all, or none of the following features. The first valve can be a normally open valve and the second valve is a normally open valve. The first valve can be a fluid-controlled valve having a control port, and where closing the first valve includes receiving a pressurized fluid from a fluid pressure source at the control port, and urging, by the fluid pressure, closure of the first valve. The method can include fluidically connecting, by a third valve, the control port to the fluid pressure source in a first configuration, and fluidically connecting, by the third valve, the control port to a fluid drain in a second configuration. The second valve can be a fluid-controlled valve having a control port, and where closing the second valve can include receiving a pressurized fluid from a fluid pressure source at the control port, and urging, by the fluid pressure, closure of the second valve. The method can include fluidically connecting, by a fourth valve, the control port to the fluid pressure source in a first configuration, and fluidically connecting, by the fourth valve, the control port to a fluid drain in a second configuration. The first fluid chamber can be configured to receive fluid pressure from a controllable servo valve configured to control fluid flow from a fluid pressure source to the first fluid chamber. The method can include a fifth valve configured to permit fluid flow from the fluid pressure source to a drain in a first configuration, and block fluid flow from the fluid pressure source to the drain in a second configuration.

In another example embodiment, a trip and throttle valve includes a fluid actuator having an actuating piston configured to control operation of a turbine based on differential fluid pressure in a first fluid chamber and a second fluid chamber, means for controllably permitting and blocking fluid flow between the first fluid chamber and the second fluid chamber, and means for sequentially testing each element of the fluid actuator without tripping the turbine of a dump valve configured to protect the turbine.

The systems and techniques described here may provide one or more of the following advantages. First, a system can provide users with an ability to test every critical component of a trip and throttle valve, including the hydraulic actuator and dump valves, in sequence, while the controlled process remains on-line. Second, the system allows the actuator to move freely, to any position, while in the un-tripped state. Third, the system can be scaled easily as cylinder sizes are increased. Fourth, the system provides increased resistance to contamination.

The details of one or more implementations are set forth in the accompanying drawings and the description below. Other features and advantages will be apparent from the description and drawings, and from the claims.

DETAILED DESCRIPTION

This document describes systems and techniques for hydraulic actuator control, more particularly, trip and throttle valve actuation. In general, the systems described in this document implement valves and passages that permit the rapid flow of large volumes of low-pressure fluid, such as those found in hydraulic actuators used in turbine and/or other process control systems. In general, the valves are partly controlled by trip pressures used in the actuators, such that test functions can performed while the controlled process remains online and without interfering with normal operation or safety functions.

Figure 1:
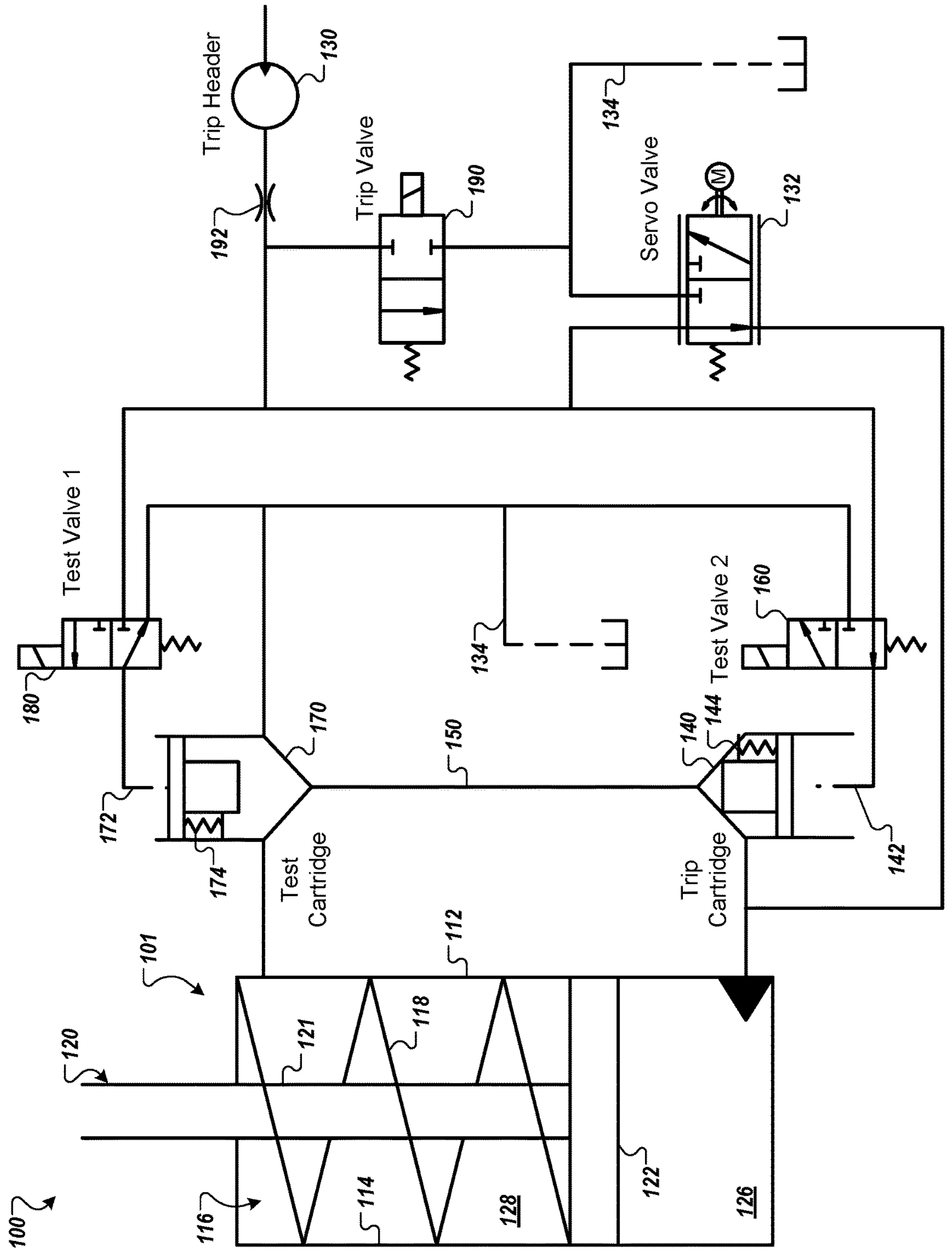
FIG. 1 is a schematic diagram that shows an example of a system for hydraulic actuator control.

FIG. 1 is a schematic diagram that shows an example of a system 100 for hydraulic actuator control. The system 100 includes a fluid (e.g., hydraulic) actuator 101. In some implementations, the actuator 101 can be configured to control a process, such as turbine control. While the example actuator 101 is shown in FIG. 1 as a linear actuator, other designs (e.g., rotary piston actuators, rotary vane actuators) could be used.

The actuator 101 includes a housing 112 having an inner wall 114 defining an interior cavity 116. The actuator 101 also includes a piston 120 having a piston rod 121 and a piston head 122 configured for reciprocal movement within the interior cavity 116. The piston head 122 is arranged so as to contact the inner wall 114 and divide the interior cavity 116 into a fluid chamber 126 and a fluid chamber 128. In operation, the fluid chamber 126 can be pressurized to urge movement of the piston 120 in a first direction (e.g., extend). The actuator 101 includes a bias member 118 (e.g., a spring) configured to urge the piston 120 in the second direction.

The system 100 includes a fluid pressure source 130. The fluid pressure source 130 serves as a trip header pressure source. A servo valve 132 is configured to controllably and selectably permit fluid flow from the fluid pressure source 130 to the fluid chamber 126 in a first configuration (e.g., to cause extension), and permit fluid flow from the fluid chamber 126 to a fluid drain 134 in a second configuration (e.g., to relieve fluid pressure during retraction). In some embodiments, the servo valve 132 can include a position sensor to provide valve position feedback that can be used in a control loop to control the position of the fluid actuator 101 by modulating pressure from the fluid pressure source 130.

The example system 100 includes a valve 140 configured to control fluid flow between the fluid chamber 126 and a bypass conduit 150. In the illustrated example, the valve 140 is a fluid controlled (e.g., cartridge) valve having a bias member 144 configured to urge the valve 140 into a normally-open configuration, and is configured to be urged closed by a pressurized fluid received at a control port 142 from the fluid pressure source 130 with enough force to overcome the bias provided by the bias member 144.

A test valve 160 is configured to fluidically connect the control port 142 to the fluid pressure source 130 in a first configuration, and fluidically connect the control port 142 to the fluid drain 134 in a second configuration. In operation, the test valve 160 is used to test operation of the valve 140. For example, the test valve 160 is normally left in the first configuration in which fluid pressure from the fluid pressure source 130 closes the valve 140, blocking flow between the fluid chamber 126 and the bypass conduit 150. During a test, the test valve 160 is switched into the second configuration, blocking fluid pressure to the control port 142 and allowing existing pressure to drain. The bias member 144 urges the valve 140 to open, fluidically connecting the fluid chamber 126 to the bypass conduit 150.

The system 100 includes a valve 170 configured to control fluid flow between the bypass conduit 150 and the fluid chamber 128. In the illustrated example, the valve 170 is a fluid controlled (e.g., cartridge) valve having a bias member 174 configured to urge the valve 170 into a normally-open configuration, and is configured to be urged closed by a pressurized fluid received at a control port 172 from the fluid pressure source 130 with enough force to overcome the bias provided by the bias member 174.

A test valve 180 is configured to fluidically connect the control port 172 to the fluid drain 134 in a first configuration, and fluidically connect the control port 172 to the fluid pressure source 130 in a second configuration. In operation, the test valve 180 is used to test operation of the valve 170. For example, the test valve 180 is normally left in the first configuration in which fluid pressure from the fluid pressure source 130 to the valve 170 is blocked and the control port 172 is fluidically connected to the fluid drain 134, allowing the bias member 174 to open the valve 170 and permit flow between the bypass conduit 150 and the fluid chamber 128. During a test, the test valve 180 is switched into the second configuration, permitting fluid pressure to the control port 172 to overcome the bias member 174 and urge the valve 170 to close, blocking flow from the bypass conduit 150 to the fluid chamber 128.

The system 100 also includes a valve 190 (e.g., a trip valve) configured to permit fluid flow from the fluid pressure source 130 to the fluid drain 134 in a first configuration, and block fluid flow from the fluid pressure source 130 to the fluid drain 134 in a second configuration. An orifice 192 restricts fluid flow from the fluid pressure source 130 so that pressure in the system drops to a low level when the valve 190 is opened to drain.

The illustrated example shows the system 100 in a normal (e.g., online, run) operational state.

Full Position Control/Turbine Startup

During startup, the system 100 is brought online by applying pressure from the fluid pressure source 130 by closing the valve 190. Simultaneously, the test valve 160 and the test valve 180 are de-energized as shown in FIG. 1.

The test valve 180 connects the control port 172 to drain pressure (e.g., the fluid drain 134), allowing the bias member 174 to open the flow path in and out of the fluid chamber 128.

The test valve 160 allows trip circuit pressure from the fluid pressure source 130 to the control port 142, closing the valve 140 against the bias member 144 and sealing the flow path from the fluid chamber 126 to the bypass conduit 150.

High Speed Trip

With the system 100 in the "Full Position Control" state as described above, the basic trip function of the system 100 is achieved, for example, by the following sequence.

The valve 190 is de-energized, for example, by a turbine safety system. With no pressure to hold it closed, the valve 140 is quickly opened by the pressure inside the fluid chamber 126, by the bias member 118, and by the bias member 144. As the valve 140 opens, it opens a flow path between the fluid chamber 126 and the bypass conduit 150. The orifice 192 restricts fluid flow from the fluid pressure source 130 so that pressure in the system drops to a low level when the valve 190 is opened to drain.

Flow is allowed between the fluid chamber 126 and the fluid chamber 128, with the remainder of the fluid displaced by the piston rod 121 exiting the fluid drain 134. Alternatively, high speed trip would also occur if pressure removed by opening the valve 190.

On-Line Functional Testing

With the system 100 in the "Full Position Control" state as described above, the on-line test capability can be achieved, for example, by the following sequence.

The test valve 180 is de-energized, admitting pressure from the fluid pressure source 130 to the control port 172. The valve 170 closes, closing the flow path from the bypass conduit 150 to the fluid chamber 128 and the fluid drain 134 simultaneously. In some implementations, the configuration of the valve 170 could be verified using one or more sensors such as proximity switches (not shown).

Shortly after the valve 170 is closed, the test valve 160 is de-energized, draining the fluid that is holding the valve 140 closed. As the valve 140 opens, the servo valve 132 is commanded to open enough to pressurize the bypass conduit 150. This prevents the fluid chamber 126 from de-pressurizing due to any air that may have been trapped in the bypass conduit 150. In some implementations, the configuration of the valve 140 could be verified using one or more sensors such as a proximity switches (not shown).

During this sequence, full position control is no longer possible since the servo valve 132 is blocked and the actuator 101 will simply remain in position. In some implementations, this may be acceptable since the on-line test sequence can be performed in a few seconds or less.

After the above steps are completed and sufficiently verified, the sequence would reverse, putting the system 100 back into "Full Position Control".

If at any time during the sequence above, a shutdown is commanded and trip circuit pressure from the fluid pressure source 130 is drained, the system 100 still maintains the ability to control the fluid actuator 101. If trip pressure is lost during the "Full Position Control" steps, the valve 170 would open and the valve 140 would open, thereby tripping the system 100. If trip pressure from the fluid pressure source 130 is lost immediately after the test valve 180 connects the control port 172 to drain pressure, the valve 170 would still open while the valve 140 would open.

In some embodiments, the test valves 160 and/or 180 can be connected to a safety system configured to de-energize the test valves 160 and 180 during a shutdown event. In the unlikely event of one of the test valves 160 or 180 failing in the energized position, the system 100 would still trip.

Figure 2:
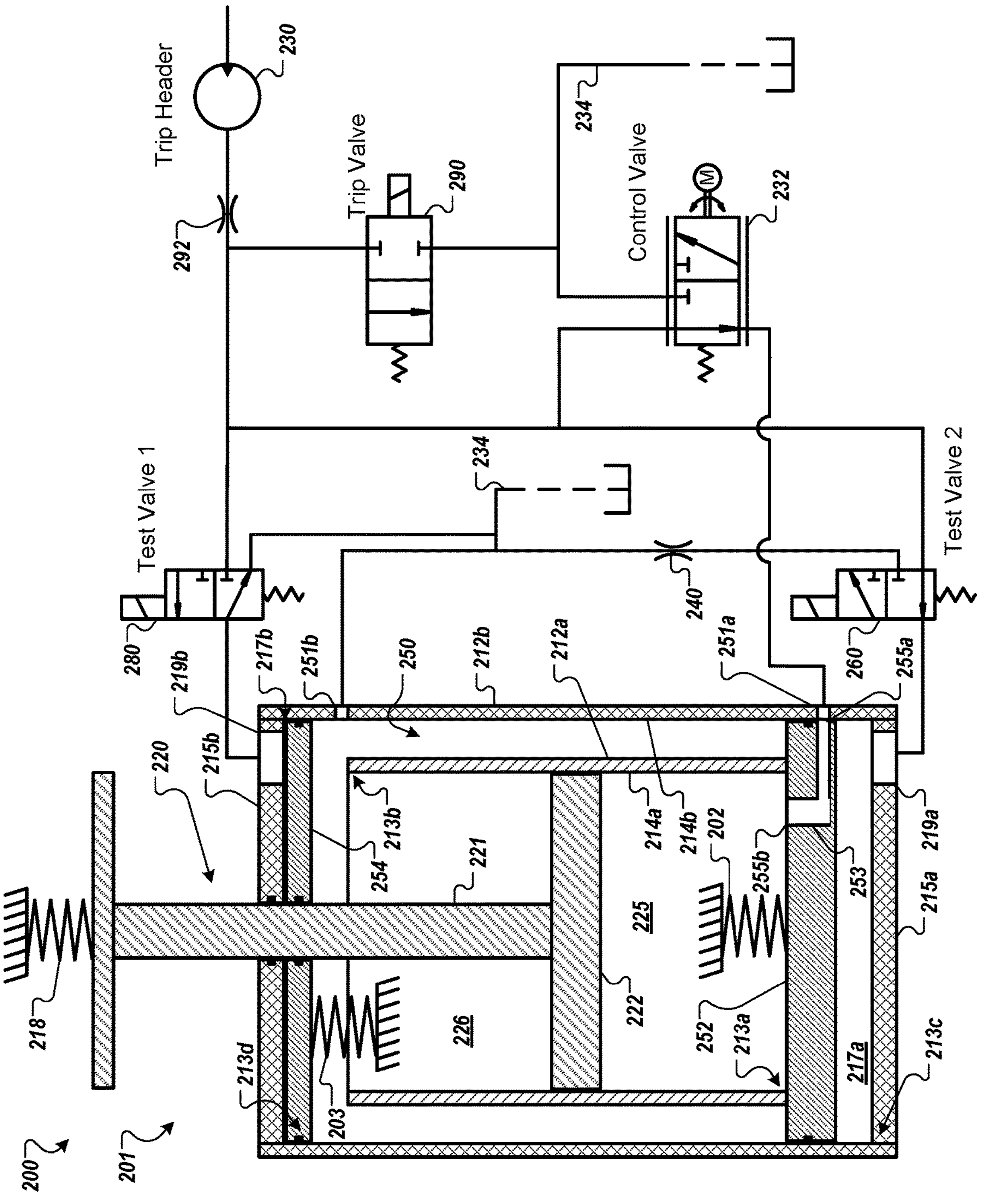
FIG. 2 is a schematic diagram that shows another example of a system for hydraulic actuator control.

FIG. 2 is a schematic diagram that shows an example of a system 200 for hydraulic actuator control. The system 200 includes a fluid (e.g., hydraulic) actuator 201. In some implementations, the actuator 201 can be configured to control a process, such as turbine control, a steam valve, or any other appropriate device or process that can be controlled by an actuator. While the example actuator 201 is shown in FIG. 2 as a linear actuator, other designs (e.g., rotary piston actuators, rotary vane actuators) could be used.

The actuator 201 includes an inner cylindrical housing 212*a* having an end 213*a*, an end 213*b* opposite the end 213*a*, and an inner wall 214*a*. The actuator 201 also includes a piston 220 having piston rod 221 and a piston head 222 configured to fluidically seal against the inner wall 214*a* and is configured to move axially along a portion of the inner wall 214*a*.

An outer cylindrical housing 212*b* is arranged at least partly about the inner cylindrical housing 212*a*. The outer cylindrical housing 212*b* has an end 213*c*, an end 213*d* opposite the end 213*c*, and an inner wall 214*b*. An annular cavity 250 is defined between the outer cylindrical housing 212*b* and the inner cylindrical housing 212*a*.

A moveable plate 252 (e.g., a dump plate) is configured to fluidically seal against the inner wall 214*b* and is configured to move axially along a portion of the inner wall 214*b* between the end 213*a* and the end 213*c*. The moveable plate 252 is configured to configurably seal against the end 213*a* in a first configuration such that the piston head 222, the inner wall 214*a*, and the moveable plate 252 define a fluid chamber 225, and configurably unseal the end 213*a* in a second configuration such that fluid flow is permitted between the fluid chamber 225 and the annular cavity 250. In some embodiments, other forms of moveable plates or elements may be used to block and unblock flow between the fluid chamber 225 and the annular cavity 250.

An end plate 215*a* is arranged proximal the end 213*c*, fluidically sealing the end 213*c*. The outer cylindrical housing 212*b*, the end plate 215*a*, and the moveable plate 252 define a fluid chamber 217*a*. A fluid port 219*a* is defined in the end plate 215*a*, in fluid communication with the fluid chamber 217*a*.

An end plate 215*b* is arranged proximal the end 213*d*, fluidically sealing the end 213*d*. The outer cylindrical housing 212*b*, the end plate 215*b*, and the moveable plate 254 define a fluid chamber 217*b*. A fluid port 219*b* is defined in the end plate 215*b*, in fluid communication with the fluid chamber 217*b*.

A fluid port 251*a* is defined in the outer cylindrical housing 212*b*. A fluid conduit 253 is defined in the moveable plate 252 between an inlet 255*a* at a lateral peripheral face of the moveable plate 252 and an outlet 255*b* at a primary face of the first moveable plate proximal the first end. The inlet 255*a* is configured to align with the fluid port 251*a* in the first configuration, and the fluid port 251*a* is blocked by the moveable plate 252 in the second configuration.

In some embodiments, system may not provide blocking of the fluid port 251*a*. For example, since the servo valve 232 uses the same trip header pressure as the rest of the system 200, the servo valve 232 may not need to be blocked off since the servo valve 232 would not have any pressure to work with in the event of a trip. In some embodiments, the fluid conduit 253 may be configured to fluidically connect the fluid port 251*a* to the outlet 255*b* regardless of the position of the moveable plate 252. In some embodiments, the fluid actuator 201 may be configured to fluidically connect the fluid port 251*a* to the fluid chamber 225 without using the moveable plate 252 (e.g., by replacing the fluid conduit 253 with a fluid conduit that connects the fluid port 251*a* to an outlet defined in the inner wall 214*a*).

A moveable plate 254 (e.g., another dump plate) is configured to fluidically seal against the inner wall 214*b* and is configured to move axially along a portion of the inner wall 214*b* between the end 213*b* and the end 213*d*. The moveable plate 254 is configured to configurably seal against the end 213*b* in a first configuration such that the piston head 222, the inner wall 214*a*, and the moveable plate 254 define a fluid chamber 226, and configurably unseal the end 213*b* in a second configuration such that fluid flow is permitted between the fluid chamber 226 and the annular cavity 250.

In operation, the fluid chamber 225 can be pressurized to urge movement of the piston 220 in a first direction (e.g., extend). The actuator 201 includes a bias member 218 (e.g., a spring) configured to urge the piston 220 in the second direction.

A fluid port 251*b*, in fluid communication with the annular cavity 250, is defined in the outer cylindrical housing 212*b* proximal the end 213*d*. The moveable plate 254 is configured to block the fluid port 251*b* in the second configuration and permit fluid flow between the fluid port 251*b* and the annular cavity 250 in the first configuration.

The actuator 201 also includes a bias member 202 configured to urge the moveable plate 252 away from sealing contact with the end 213*a*. A bias member 203 is configured to urge the moveable plate 254 away from sealing contact with the end 213*b*.

The system 200 includes a fluid pressure source 230. The fluid pressure source 230 serves as a trip header pressure source. A servo valve 232 is configured to controllably and selectably permit fluid flow from the fluid pressure source 230 to the fluid chamber 225 in a first configuration (e.g., to cause extension), and permit fluid flow from the fluid chamber 225 to a fluid drain 234 in a second configuration (e.g., to relieve fluid pressure during retraction). In some embodiments, the servo valve 232 can include a position sensor to provide valve position feedback that can be used in a control loop to control the position of the fluid actuator 201 by modulating pressure from the fluid pressure source 230.

A test valve 260 is configured to fluidically connect the fluid port 219*a* and the fluid chamber 217*a* to the fluid pressure source 230 in a first configuration, and fluidically connect the fluid port 219*a* to the fluid drain 234 though an orifice 240 (e.g., a flow restrictor) in a second configuration. In operation, the test valve 260 is used to test operation of the moveable plate 252. For example, the test valve 260 is normally left in the first configuration in which fluid pressure from the fluid pressure source 230 urges the moveable plate 252 into sealing contact with the end 213*a*, blocking flow between the fluid chamber 225 and the annular cavity 250. During a test, the test valve 260 is switched into the second configuration, blocking fluid pressure to the fluid port 219*a* and the fluid chamber 217*a* and allowing existing pressure to drain. The bias member 202 urges the moveable plate 252 to open, fluidically connecting the fluid chamber 217*a* to the annular cavity 250.

A test valve 280 is configured to fluidically connect the fluid port 219*b* and the fluid chamber 217*b* to the fluid drain 234 in a first configuration, and fluidically connect the fluid port 219*b* and the fluid chamber 217*b* to the fluid pressure source 230 in a second configuration. In operation, the test valve 280 is used to test operation of the moveable plate 254. For example, the test valve 280 is normally left in the first configuration in which fluid pressure from the fluid pressure source 230 to the fluid port 219*b* and the fluid chamber 217*b* is blocked and the and the fluid chamber 217*b* and the fluid chamber 217*b* are fluidically connected to the fluid drain 234, allowing the bias member 203 to open the moveable plate 254 and permit flow between the annular cavity 250 and the fluid chamber 226. During a test, the test valve 280 is switched into the second configuration, permitting fluid pressure to the fluid chamber 217*b* to overcome the bias member 203 and urge the moveable plate 254 closed, blocking flow from the annular cavity 250 to the fluid chamber 226.

The system 200 also includes a valve 290 (e.g., a trip valve) configured to permit fluid flow from the fluid pressure source 230 to the fluid drain 234 in a first configuration, and block fluid flow from the fluid pressure source 230 to the fluid drain 234 in a second configuration. An orifice 292 restricts fluid flow from the fluid pressure source 230 so that pressure in the system drops to a low level when the valve 290 is opened to drain.

The illustrated example shows the system 200 in a normal (e.g., online, run) operational state.

Full Position Control/Turbine Startup

During startup, the system 200 is brought online by applying pressure from the fluid pressure source 230 by closing the valve 290. Simultaneously, the test valve 260 and the test valve 280 are de-energized as shown in FIG. 2.

The test valve 280 connects the fluid chamber 217*b* to drain pressure at the fluid drain 234, allowing the bias member 203 to open a flow path between the fluid chamber 226 and the annular cavity 250.

The test valve 260 is configured to allow trip circuit pressure to the fluid chamber 217*a*, moving the moveable plate 252 against the bias member 202, and sealing a flow path between the fluid chamber 225 to annular cavity 250. The larger pressure area of the fluid chamber 217*a* allows it to move the moveable plate 252 into sealing contact with the end 213*a* and remain sealed even when the fluid chamber 225 is fully pressurized. The bias members 202 and 203 provide a relatively insignificant force to the moveable plates 252 and 254 when compared to the forces exerted by the hydraulic pressures.

As the moveable plate 252 moves upward, a flow path is exposed (e.g., by the fluid conduit 253) from the fluid chamber 225 to the servo valve 232. Once connected to the servo valve 232 and in full position control, the piston 220 can be moved while the turbine is online to verify the functionality of the mechanism that the piston 220 is configured to actuate (e.g., to determine if attached steam valve is seized).

High Speed Trip

With the system in the "Full Position Control" state as described above, a basic trip function of the double dump plate design can be achieved, for example, by the following sequence.

The valve 290 is de-energized, for example, by a turbine safety system. When de-energized, the valve 290 allows fluid pressure in the system 200 to flow to the fluid drain 234.

With no pressure to hold it upward, the moveable plate 252 is quickly forced open by the pressure inside the fluid chamber 225 and the bias member 202. As the moveable plate 252 moves away from the end 213*a*, it opens a flow path between the fluid chamber 225 and the annular cavity 250. Simultaneously, the moveable plate 252 blocks the fluid port 251*a* from the servo valve 232. In some embodiments, system may not provide blocking of the fluid port 251*a*. For example, since the servo valve 232 uses the same trip header pressure as the rest of the system 200, the servo valve 232 may not need to be blocked off since the servo valve 232 would not have any pressure to work with in the event of a trip. In some embodiments, the fluid conduit 253 may be configured to fluidically connect the fluid port 251*a* to the outlet 255*b* regardless of the position of the moveable plate 252. In some embodiments, the fluid actuator 201 may be configured to fluidically connect the fluid port 251*a* to the fluid chamber 225 without using the moveable plate 252 (e.g., by replacing the fluid conduit 253 with a fluid conduit that connects the fluid port 251*a* to an outlet defined in the inner wall 214*a*).

Flow is allowed between the fluid chamber 225 into the annular cavity 250. Most of this flow is re-circulated to the fluid chamber 226, with the remainder of the fluid displaced by the piston rod 221 exiting the fluid port 251*b*. Alternatively, high speed trip would also occur if pressure removed by opening the valve 290.

On-Line Functional Testing

With the actuator 201 connected to the servo valve 232 and in the "Full Position Control" state as described above, the piston 220 can be moved while the turbine is online to verify the functionality of the mechanism that the piston 220 is configured to actuate (e.g., to determine if attached steam valve is seized). With the system in the "Full Position Control" state, an on-line test capability can be achieved, for example, by the following sequence.

The test valve 280 is de-energized, admitting pressure from the fluid pressure source 230 to the fluid chamber 217*b*.

The moveable plate 254 seals against the end 213*b*, closing the flow path to the annular cavity 250 and the fluid port 251*b* (e.g., and the fluid drain 234) substantially simultaneously. In some implementations, the position of the moveable plate 254 could be verified using one or more sensors such as proximity switches (not shown).

Shortly after the moveable plate 254 is seated against the end 213*b*, the test valve 260 is de-energized, draining the fluid in the fluid chamber 217*a* through the orifice 240.

As the moveable plate 252 opens slowly due to the orifice 240, the servo valve 232 is commanded to open enough to pressurize the annular cavity 250 before the fluid port 251*a* becomes blocked by the moveable plate 252. This prevents the main cylinder from de-pressurizing due to any air that may have been trapped between cylinders 4 and 5.

In some embodiments, during this sequence, full position control may no longer be possible since the servo valve 232 is blocked and the actuator 201 will simply remain in position. In some implementations, this may be acceptable since the on-line test sequence can be performed in a few seconds or less. In some implementations, the position of the moveable plate 252 may be verified using one or more sensors such as proximity switches (not shown).

After the above steps are completed and sufficiently verified, the sequence would reverse, putting the system 100 back into "Full Position Control".

If at any time during the sequence above, a shutdown is commanded and trip circuit pressure from the fluid pressure source 230 is drained, the system 200 still maintains the ability to trip the actuator 201. If trip pressure from the fluid pressure source 230 is lost during the "Full Position Control" steps, the moveable plate 254 would move back to the open configuration and the moveable plate 252 would move back to the open configuration, thereby tripping the unit.

If trip pressure from the fluid pressure source 230 is lost immediately after the moveable plate 254 seals, the moveable plate 254 would still move to the open configuration while the moveable plate 252 would move to the open configuration. The opening movement of the moveable plate 252 would be slower if the test valve 260 remained energized, restricting the flow from the fluid chamber 217*a* through the orifice 240.

In some embodiments, the test valves 260 and/or 280 can be connected to a safety system configured to de-energize the test valves 260 and 280 during a shutdown event. In the unlikely event of one of the test valves 260 or 280 failing in the energized position, the system 200 would still trip.

If in the rare event of an on-line test valve failing in the energized position, the double dump plate design of the actuator 201 would still trip, but at a reduced speed due to the orifice 240. In some embodiments, the orifice 240 can be configured to be sufficiently large to provide an acceptable speed reduction.

Figure 3:
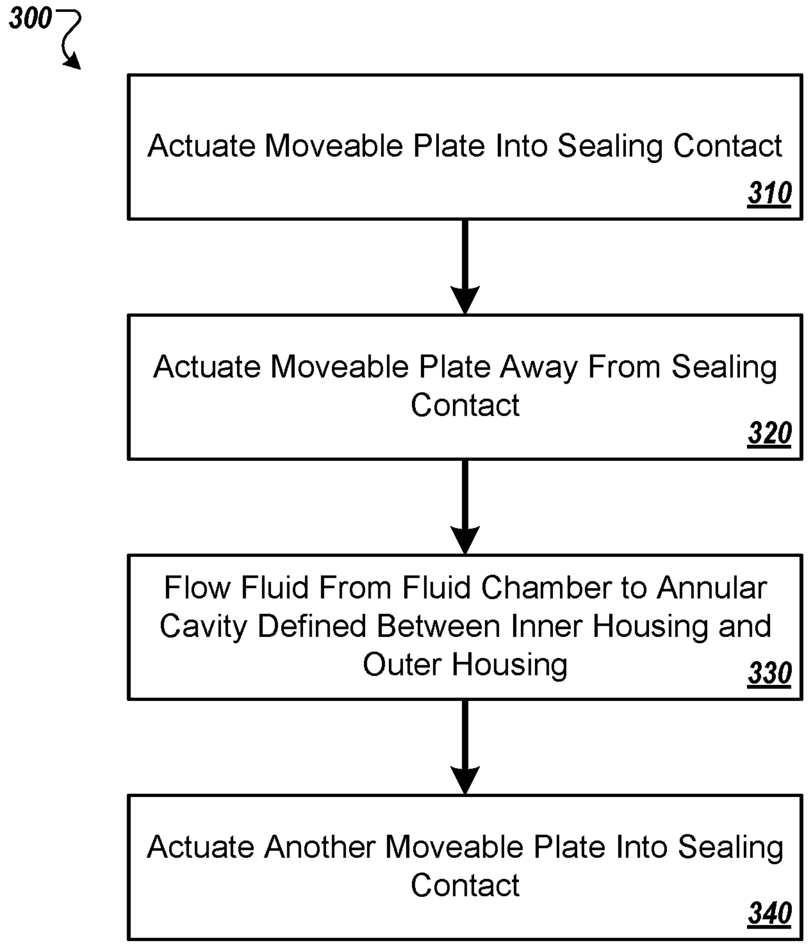
FIG. 3 is a flow diagram of an example process for hydraulic actuator control.

FIG. 3 is a flow diagram of an example process 300 for hydraulic actuator control. In some implementations, the process 300 can be performed by the example system 100 of FIG. 1 or the example system 200 of FIG. 2.

At 310, a first moveable plate is actuated into sealing contact with a first end of an inner cylindrical housing having a first inner wall and a second end opposite the first end, wherein a piston in fluidically sealing contact with the first inner wall, the first inner wall, and the first moveable plate in sealing contact with the first end define a first fluid chamber. For example, the example moveable plate 252 is configured to fluidically seal against the inner wall 214*b* and is configured to move axially along a portion of the inner wall 214*b* between the end 213*a* and the end 213*c*. The moveable plate 252 is configured to configurably seal against the end 213*a* in a first configuration such that the piston head 222, the inner wall 214*a*, and the moveable plate 252 define the fluid chamber 225.

In some implementations, actuating the first moveable plate into sealing contact with the first end further can include fluidically connecting, by a fluid conduit defined in the first moveable plate between an inlet at a lateral peripheral face of the first moveable plate and an outlet at a primary face of the first moveable plate proximal the first end, the first fluid chamber and a fluid port defined in the outer cylindrical housing. In some implementations, actuating the first moveable plate into sealing contact with the first end can include pressurizing a fluid chamber defined by the first moveable plate, the second inner wall, and an end plate proximal the third end, and urging, by the pressurizing, movement of the first moveable plate toward the first end. For example, the fluid conduit 253 is defined in the moveable plate 252 between an inlet 255*a* at a lateral peripheral face of the moveable plate 252 and the outlet 255*b* at a primary face of the first moveable plate proximal the first end. The inlet 255*a* is configured to align with the fluid port 251*a* in the first configuration, and the fluid port 251*a* is blocked by the moveable plate 252 in the second configuration.

At 320, the first moveable plate is actuated away from sealing contact with the first end. For example, the example moveable plate 252 is configured to configurably unseal the end 213*a* in a second configuration.

In some implementations, actuating the first moveable plate away from sealing contact with the first end further can include blocking, by the first moveable plate, the fluid port. For example, the inlet 255*a* is configured to align with the fluid port 251*a* in the first configuration, and the fluid port 251*a* is blocked by the moveable plate 252 in the second configuration.

In some implementations, actuating the first moveable plate away from sealing contact with the first end can include urging, by a bias member, the first moveable plate away from the first end. For example, the bias member 202 is configured to urge the moveable plate 252 away from sealing contact with the end 213*a*.

At 330, fluid is flowed from the first fluid chamber to an annular cavity defined between the inner cylindrical housing and an outer cylindrical housing arranged at least partly about the inner cylindrical housing, the outer cylindrical housing having a third end, a fourth end opposite the third end, and a second inner wall. For example, the example moveable plate 252 is configured to configurably unseal the end 213*a* in a second configuration such that fluid flow is permitted between the fluid chamber 225 and the annular cavity 250.

At 340, a second moveable plate is actuated into sealing contact with the second end wherein the piston, the first inner wall, and the second moveable plate in sealing contact with the second end define a second fluid chamber. For example, the example moveable plate 254 is configured to fluidically seal against the inner wall 214*b* and is configured to move axially along a portion of the inner wall 214*b* between the end 213*b* and the end 213*d*. The moveable plate 254 is configured to configurably seal against the end 213*b* in a first configuration such that the piston head 222, the inner wall 214*a*, and the moveable plate 254 define a fluid chamber 226.

In some implementations, actuating the second moveable plate into sealing contact with the second end can include blocking, by the second moveable plate, a fluid port defined in the outer cylindrical housing proximal the fourth end, and actuating the second moveable plate away from sealing contact with the second end unblocks the fluid port and permits fluid flow between the fluid port and the annular cavity. For example, the fluid port 251*b*, in fluid communication with the annular cavity 250, is defined in the outer cylindrical housing 212*b* proximal the end 213*d*. The moveable plate 254 is configured to block the fluid port 251*b* in the second configuration and permit fluid flow between the fluid port 251*b* and the annular cavity 250 in the first configuration.

In some implementations, actuating the second moveable plate into sealing contact with the second end can include pressurizing a fluid chamber defined by the second moveable plate, the second inner wall, and an end plate proximal the fourth end, and urging, by the pressurizing, movement of the second moveable plate toward the second end. For example, the test valve 280 can be switched into the second configuration, permitting fluid pressure to the fluid chamber 217*b* to overcome the bias member 203 and urge the moveable plate 254 closed, blocking flow from the annular cavity 250 to the fluid chamber 226.

In some implementations, the process 300 can include urging, by a bias member, movement of the second moveable plate away from the second end. For example, the bias member 203 is configured to urge the moveable plate 254 away from sealing contact with the end 213*b*.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A fluid actuator comprising:

an inner cylindrical housing having a first end, a second end opposite the first end, and a first inner wall;

a piston comprising a piston head configured to fluidically seal against the first inner wall and configured to move axially along a portion of the first inner wall;

an outer cylindrical housing arranged at least partly about the inner cylindrical housing, the outer cylindrical housing having a third end, a fourth end opposite the third end, and a second inner wall;

an annular cavity defined between the outer cylindrical housing and the inner cylindrical housing;

a first moveable plate configured to fluidically seal against the second inner wall and configured to move axially along a first portion of the second inner wall between the first end and the third end, configurably seal against the first end in a first configuration such that the piston head, the first inner wall, and the first moveable plate define a first fluid chamber, and configurably unseal the first end in a second configuration such that fluid flow is permitted between the first fluid chamber and the annular cavity; and a second moveable plate configured to fluidically seal against the second inner wall and configured to move axially along a second portion of the second inner wall between the second end and the fourth end.

2. The fluid actuator of claim 1, further comprising:

a fluid port defined in the outer cylindrical housing; and a fluid conduit defined in the first moveable plate between an inlet at a lateral peripheral face of the first moveable plate and an outlet at a primary face of the first moveable plate proximal the first end, wherein the inlet is configured to align with the fluid port in the first configuration, and the fluid port is blocked by the first moveable plate in the second configuration.

3. The fluid actuator of claim 1, wherein the second moveable plate is configured to configurably seal against the second end in a first configuration such that the piston head, the first inner wall, and the second moveable plate define a second fluid chamber, and configurably unseal the second end in a second configuration such that fluid flow is permitted between the second fluid chamber and the annular cavity.

4. The fluid actuator of claim 3, further comprising a fluid port, in fluid communication with the annular cavity, defined in the outer cylindrical housing proximal the fourth end, wherein the second moveable plate is configured to block the fluid port in the second configuration and permit fluid flow between the fluid port and the annular cavity in the first configuration.

5. The fluid actuator of claim 1, further comprising a first bias member configured to urge the first moveable plate away from sealing contact with the first end.

6. The fluid actuator of claim 1, further comprising a second bias member configured to urge the second moveable plate away from sealing contact with the second end.

7. The fluid actuator of claim 1, further comprising:

an end plate proximal the third end, wherein the outer cylindrical housing, the end plate, and the first moveable plate define a fluid chamber; and a fluid port defined in the end plate, in fluid communication with the fluid chamber.

8. The fluid actuator of claim 1, further comprising:

an end plate proximal the fourth end, wherein the outer cylindrical housing, the end plate, and the second moveable plate define a fluid chamber; and a fluid port defined in the end plate, in fluid communication with the fluid chamber.

* * * * *